United States Patent [19]
Nogami et al.

[11] 4,330,207
[45] May 18, 1982

[54] FLUORESCENCE SPECTROPHOTOMETER

[75] Inventors: Taro Nogami; Hiroshi Hirose, both of Katsuta, Japan

[73] Assignee: Hitachi, Ltd., Tokyo, Japan

[21] Appl. No.: 45,630

[22] Filed: Jun. 5, 1979

[30] Foreign Application Priority Data

Jun. 5, 1978 [JP] Japan .................................. 53-66718

[51] Int. Cl.³ .......................................... G01N 21/64
[52] U.S. Cl. .................................... 356/318; 250/458
[58] Field of Search .............. 356/317, 318, 319, 326; 250/458, 459, 461, 461 B

[56] References Cited

U.S. PATENT DOCUMENTS 4,176,957 12/1979 Maeda et al. ....................... 356/319
4,198,567 4/1980 Eneroth et al. ..................... 250/459

OTHER PUBLICATIONS

"An On-Line Spectrofluorimeter System for Rapid Collection of Absolute Luminescence Spectra", Wampler et al; Applied Spectroscopy; vol. 25, #16 (1971) pp. 623-627.

Aminco-Bowman Spectrophotometer Cat. #4-8100; Oct., 1958, pp. 10-13.
"Apparatus . . . Digital Recording System", Lipsett et al; Applied Optics, vol. 9, #6, Jun. 1970, pp. 1312-1318.

*Primary Examiner*—Vincent P. McGraw
*Attorney, Agent, or Firm*—Craig & Antonelli

[57] ABSTRACT

A fluorescence spectrophotometer comprising a light source, an excitation side monochromator which makes light from the light source be subjected to spectroscopic analysis for illuminating as actinic light a sample, a fluoroscence side monochromator which makes fluorescence light from the sample be subjected to spectroscopic analysis, a detector which detects light from the fluorescence side monochromator, and a scanning means which adjusts both the monochromators to the wavelengths of the actinic light and the fluorescence light to be scanned. These monochromators are arranged in such a way that one of them is automatically set to the location of the peak wavelength value which is detected by itself through a simple and automatic wavelength scanning operation and then the other is wavelength-scanned for excitation spectrum or fluorescence spectrum measurement.

4 Claims, 3 Drawing Figures

FLUORESCENCE SPECTROPHOTOMETER

This invention relates to a fluorescence spectrophotometer and, in particular, to a spectrophotometer which, when an excitation spectrum or fluorescence spectrum is measured, can automatically detect the peak wavelength thereby to set automatically the spectrum to the wavelength location corresponding to the peak wavelength.

By a fluorescence spectrophotometer is meant a device in which an excitation side monochromator converts light from a light source into monochromatic light for illuminating as actinic light a sample and a fluorescence side monochromator converts fluorescence light from the sample into monochromatic light for detection. In this case, the excitation spectrum is measured by fixing the wavelength of the fluorescence side monochromator while wavelength-scanning the excitation side monochromator. Heretofore, various complicated manual adjustments have been required for performing these spectrum measurements. For example, when an excitation spectrum is to be measured, it is required prior to wavelength-scanning the excitation side monochromator that the fluorescence side monochromator is varied with respect to its wavelength to find the peak wavelength as an optimum luminescence wavelength for setting its wavelength to the peak wavelength location. After that, the excitation side monochromator is wavelength-scanned for measuring the excitation spectrum. This is the same for the measurement of the fluorescence spectrum.

Although the adjustment operations, such as the peak wavelength measurement and the setting to the peak wavelength location, are only preliminary ones in view of the original spectrum measurement, the time required for these adjustment operations amounts to about sixty percent of that for the whole spectrum measurement.

Thus, it is greatly required that these complicated adjustments can be automatically performed by a simple operation and in a short time.

An object of this invention is to provide a fluorescent spectrophotometer which can, in order to make spectrum measurement, perform automatically by a simple operation the detection of the peak wavelength and the setting of the peak wavelength location.

A feature of this invention is that: the fluorescence spectrophotometer is provided with two monochromators, one for the excitation side and the other for the fluorescence side, one of which is wavelength-scanned and the other of which is fixed in wavelength, a detector which detects light from the fluorescence side monochromator, a memory means which compares the output signals from the detector for every sweeping so as to detect and store the peak value, and a set means which, after the peak value has been detected, sets one of the two monochromators to the wavelength location corresponding to the peak value stored in the memory means; and after the one of the monochromators has been set to the peak wavelength location by the set means, the other of the monochromators is wavelength-scanned for measuring the desired spectrum.

Other objects, features and advantages of the present invention will be readily apparent from the detailed description taken in conjunction with the accompanying drawings, in which.

Figure 1:
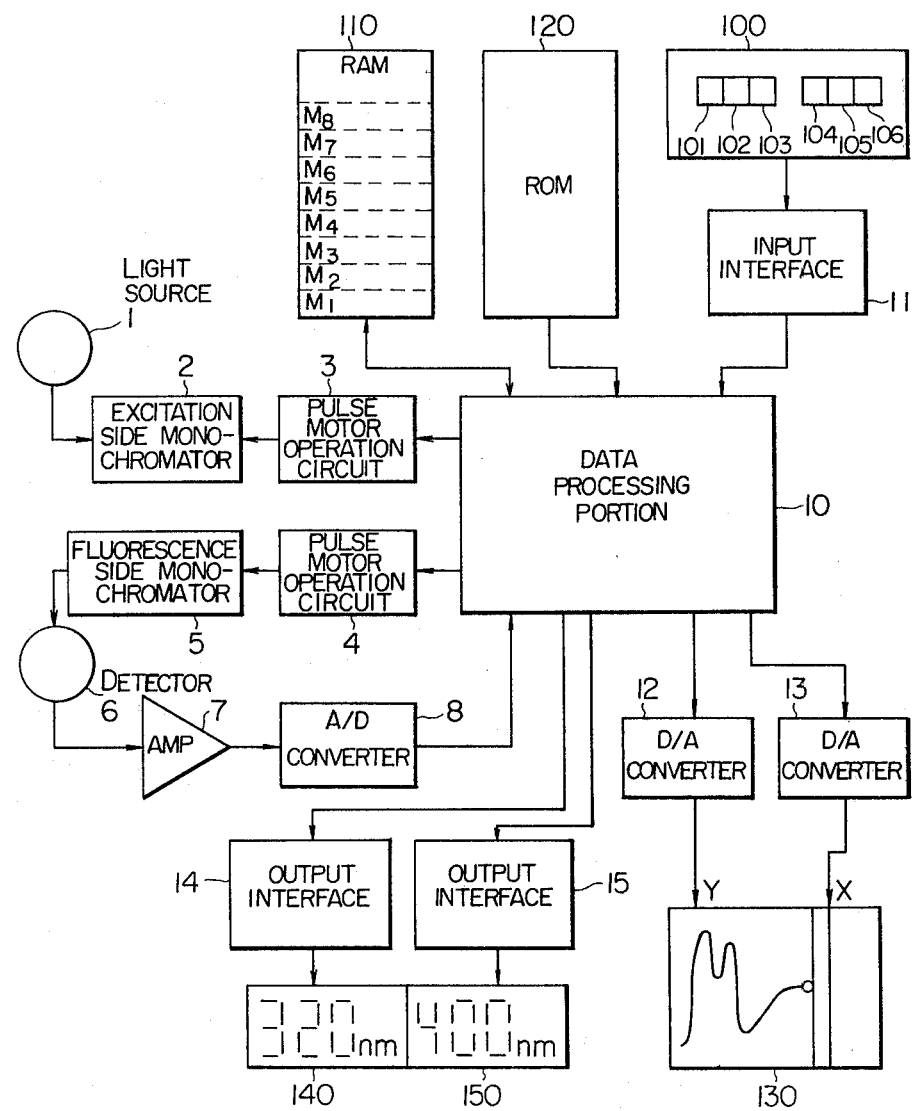
FIG. 1 is a block diagram of a fluorescence spectrophotometer as one embodiment of this invention.

Now, an embodiment of this invention will be described in conjunction with FIGS. 1 and 2. Referring to FIG. 1, light from a light source 1 is converted by an excitation side monochromator 2 into monochromatic light for illuminating as actinic light a sample (not shown). Dispersing elements such as diffraction gratings or the like in the excitation side monochromator 2 are driven by a pulse motor (not shown) which is, in turn, driven according to the instruction given by a data processing portion 10 through a pulse motor operation circuit 3. Fluorescence light generated from the sample is subjected to spectroscopic analysis by the fluorescence side monochromator 5 so as to be detected by a detector 6. The fluorescence side monochromator 5 is driven by the data processing portion 10 through the pulse motor operation circuit 4. The output signal from the detector 6 is amplified by an amplifier 7 and then converted by an analog-to-digital converter (A-D converter) 8 into a digital form for supply to the data processing portion 10. The thus supplied data is, after being processed as required, supplied through a digital-to-analog converter (D-A converter) 12 to the Y-axis input of a X-Y recorder 130. On the other hand, data concerning wavelength is supplied through a D-A converter 13 to the Y-axis input of the X-Y recorder 130. The excitation wavelength and the fluorescence wavelength are displayed on display portions 140 and 150 through output interfaces 14 and 15, respectively, in a digital manner.

An operation panel 100 serves to control the whole spectrum measurement in the fluorescence spectrophotometer and is provided with six keys 101 to 106. Although actually there may be other keys, only the above-mentioned six keys will be described for the sake of convenience. The key 101 is an excitation side wavelength set key and, by depressing it, the excitation side monochromator 2 is automatically restored to the starting position of sufficiently short wavelength. The key 102 is an excitation side survey wavelength operation key and, by depressing it, surveying is started so that the excitation side monochromator 2 is wavelength-scanned. By depressing the key 102 again, surveying is stopped, that is, wavelength-scanning is stopped. The key 103 is an excitation side measuring wavelength scanning key and, by depressing it, recording is started so that the recorder 130 records the spectrum. By depressing the key 103 again, the spectrum recording is stopped.

The above-mentioned three keys 101 to 103 are the excitation side control keys, while the three keys 104 to 106 to be described below are fluorescence side control keys. The key 104 is a fluorescence side wavelength set key and, by depressing it, the fluorescence side monochromator 5 is automatically restored to the starting position of sufficiently short wavelength. The key 105 is a fluorescence side survey wavelength operation key and, by depressing it, surveying is started so that the fluorescence side monochromator 5 is wavelength-scanned. By depressing the key 105 again, surveying is stopped, that is, wavelength scanning is stopped. The key 106 is a fluorescence side measuring wavelength scanning key and, by depressing it, recording is started so that the recorder 130 records the spectrum. By depressing the key 106 again, the spectrum recording is stopped. Incidentally, 11 represents an input interface.

Figure 2:
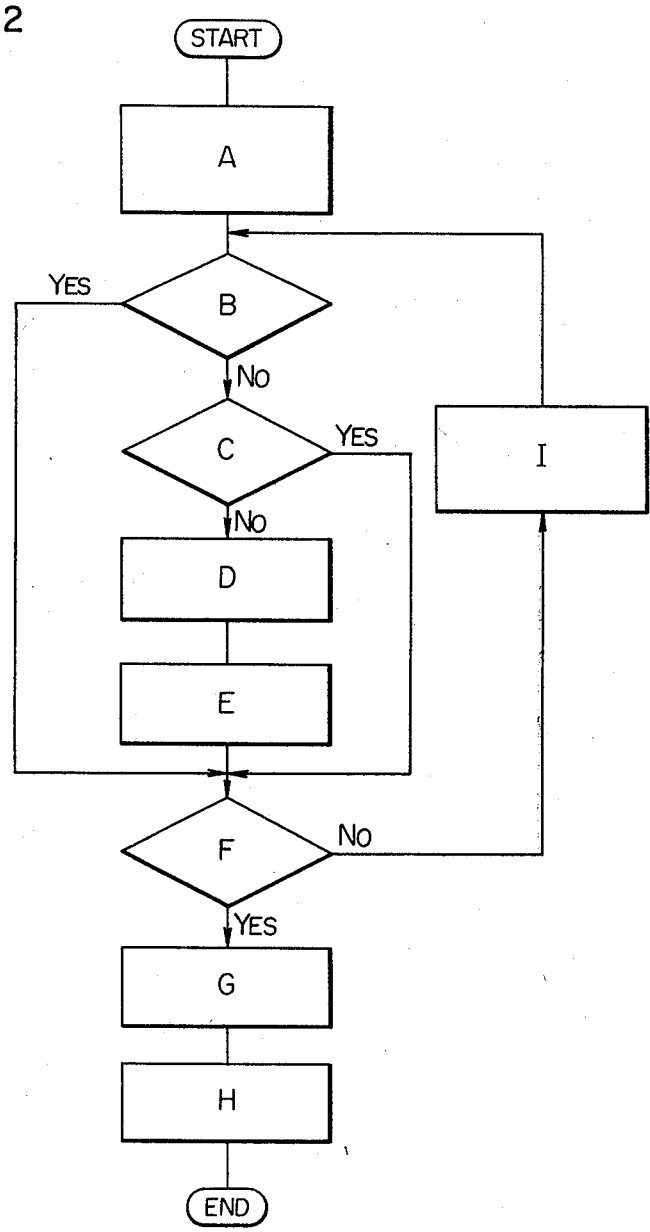
FIG. 2 is a flow chart for detecting the peak wavelength in the embodiment of FIG. 1.

In a read only memory (ROM) 120, the program shown in the flow chart of FIG. 2 is stored. The data processing portion 10 reads out the program stored in ROM 120 according to a predetermined sequence so that the detection of peak wavelength and the setting to the location of the detected peak wavelength are automatically performed according to the flow chart of FIG. 2. A random access memory (RAM) 110 reads out the contents stored in addresses M1 to M8 to the data processing portion 10 and also writes in the addresses M1 to M8 according to the instructions from the data processing portion.

The contents to be stored in these addresses M1 to M8 are follows.

The address M1 is an excitation wavelength memory portion which stores data corresponding to the wavelength range to be scanned.

The address M2 is a fluorescence wavelength memory portion which stores data corresponding to the wavelength range to be scanned.

The address M3 is a maximum signal memory portion which stores the maximum value so far of the output signals from the detector 6 varying depending on the wavelength scanning of the monochromator. That is, the output signal which has been supplied newly from the detector 6 to the data processing portion 10 as a result of wavelength scanning is compared with the content of the address M3. When the newly supplied signal is larger than that stored in the address M3, the supplied signal is written as a new maximum signal in the address M3; while, when the former is smaller than the latter, the stored signal is stored again as a new maximum signal in the address M3.

The address M4 is a peak value memory portion in which, when wavelength scanning has been finished, the maximum signal stored in the address M3 is written as a peak value.

The address M5 is an excitation peak wavelength memory portion in which the excitation wavelength in the address M1 corresponding to the maximum signal stored in the address M3 is written as a peak wavelength.

The address M6 is a fluorescence peak wavelength memory portion in which the fluorescence wavelength in the address M2 corresponding to the maximum signal stored in the address M3 is written as a peak wavelength.

The address M7 is an excitation set wavelength memory portion which sets in advance the starting wavelength for excitation wavelength-scanning to store it.

The address M8 is a fluorescence set wavelength memory portion which sets in advance the starting wavelength for fluorescence wavelength-scanning to store it.

The data processing portion 10, the RAM 110 and the ROM 120 and such others are constituted to form a so-called microcomputer and thus the embodiment shown in FIG. 1 can be considered to be a computer controlled fluorescence spectrophotometer. FIG. 2 shows the flow chart of the program for computer-controlling the fluorescence spectrophotometer shown in FIG. 1.

Next, a manner of survey wavelength scanning in order to obtain the optimum fluorescence wavelength or optimum excitation wavelength for measuring the excitation spectrum or fluorescence spectrum will be described. The program of this survey wavelength scanning is stored within the ROM 120 and its flow chart is as shown in FIG. 2. In the following, the measurement of the excitation spectrum will be explained.

Step 1 (preliminary processing)

By depressing the key 101, the excitation side monochromator 2 is set and fixed to an appropriate wavelength location. After that, the key 104 is depressed so that the fluorescence side monochromator 5 is set to the starting wavelength location.

Step 2 (survey wavelength scanning)

By depressing the key 105, an instruction of survey wavelength scanning shown as the process A in FIG. 2 is supplied from the data processing portion 10. The data processing portion 10 reads out successively the fluorescence wavelengths stored in the address M2 of the RAM 110 and drives a pulse motor through the pulse motor operation circuit 4. On the other hand, the fluorescence side monochromator 5 is set successively to the locations of the wavelengths stored in the address M2 of the RAM 110.

The output signal from the fluorescence side monochromator 5 is detected by the detector 6 to be supplied through the amplifier 7 and the A-D converter 8 to the data processing portion 10.

The data processing portion 10 performs first the decision B in the flow chart of FIG. 2. In the process of the decision B, the fixed wavelength of the excitation side monochromator 2 is compared with the wavelength of the fluorescence side monochromator 5 which has been read out from the address M2 of the RAM 110 so that the judgement "YES" is made when these wavelengths are substantially equal while the judgement "NO" is made otherwise. This is made in order to eliminate the influence of scattered light. That is, when the fluorescence wavelength and the excitation wavelength are substantially equal, a peak is generated by scattered light and thus it becomes necessary to distinguish this peak from the fluorescence peak to be obtained.

When the judgement "YES" is made in the decision B, jumping to the decision F is made; while, when the judgement is "NO", the decision C follows.

In the process of the decision C, the signal stored in the address M3 of the RAM 110 is compared with the signal supplied newly to the data processing portion. When the new signal is larger than the stored one, the judgement "NO" is made and the process D follows; while, when the new signal is smaller than the stored one, the judgement "YES" is made and jumping to the decision F is made. In the case of the judgement "YES", the stored signal is again written as the maximum signal in the address M3 of the RAM 110.

When the judgement "NO" is made in the decision C, it becomes necessary to change the content of the RAM 110 and this is made in the processes D and E. Thus, in the process D, the new signal is written as the maximum signal in the address M3 of RAM 110; while, in the process E, the peak wavelength stored in the address M6 is replaced by the fluorescence wavelength in the address M2 of RAM 110, as the peak wavelength, corresponding to the new signal.

After the above-described processes and decisions, the judgement whether the survey wavelength scanning has been finished or not is made in the decision F. It is only in the following two cases that the judgement "YES" is made. One is the case that, since wavelength scanning has been actually finished, the key 105 is depressed; and the other is the case that, although the wavelength scanning has not been finished yet, the key 103 is depressed assuming the peak wavelength being detected.

Thus, usually the decision F is judged to be "NO" so that the feedback to the process I is made. In the process I, the pulse motor is advanced one step so that the decision B at the next wavelength location may be made.

When the judgement "YES" is made in the decision F, the survey wavelength scanning is finished. Thus, in the process G, the peak value of the fluorescence spectrum is stored in the address M4 of the RAM 110 and, in the process H, the peak wavelength is stored in the address M6 of the RAM 110.

The data processing portion 10 drives the pulse motor operation circuit 4 so that the fluorescence side monochromator 5 is automatically set and thereafter fixed to the location of the detected peak wavelength.

Thus, the survey wavelength scanning in Step 2 is finished.

Step 3 (spectrum measurement)

By depressing the key 101, the excitation side monochromator 2 is set to the starting wavelength location. Next, by depressing the key 102, the excitation spectrum measurement is started. The measurement is stopped by depressing the key 102 again. The data for the excitation spectrum measurement is processed in the data processing portion 10 and stored in the appropriate address of the RAM 110.

This step serves as the wavelength-sweeping for the spectrum recorded to be described below.

Step 4 (spectrum recording)

By depressing the key 103, the excitation spectrum is recorded by the recorder 130 and, by depressing the key 103 again, the recording is stopped.

When the spectrum is to be recorded on the recorder 130, the data processing portion 10 reads out the peak value in the address M4 of the RAM 110 and makes adjustment so that the peak value amounts to about 70% of the full scale of the recorder. In particular, the data processing portion 10 multiplies a factor through the D-A converter to the output from the Y-axis of the recorder 130 so that the recorder 130 is subject to auto gain control so as to provide the above-mentioned scale.

Thus, the spectrum is uniformly reduced or magnified when the intensity of the fluorescence light is strong or weak, respectively, so as to be recorded on the recorder 130. Consequently, the recorded data are very easy to read and available for spectrum analysis.

As described above, the excitation spectrum can be measured through the steps 1 to 4. The fluorescence spectrum can also be measured similarly.

Of course, when the excitation spectrum and the fluorescence spectrum are measured, the data processing portion 10 supplies the excitation wavelength and the fluorescence wavelength through the output interfaces 14 and 15, respectively, to the display portion 140 for displaying.

Thus, it is possible by a simple key operation to perform the spectrum measurement, to detect automatically the peak wavelength and to adjust automatically the peak wavelength location and consequently the troublesome adjustment in prior art is not required.

Further, the time required for the preliminary operations is reduced to about one third as compared with that in prior art and thus the whole measurement time is also reduced.

The above-described description is concerned with the spectrum measurement by means of computer control using microcomputers. However, of course, the spectrum measurement can be performed by means of some hardware constitution rather than computer control.

Figure 3:
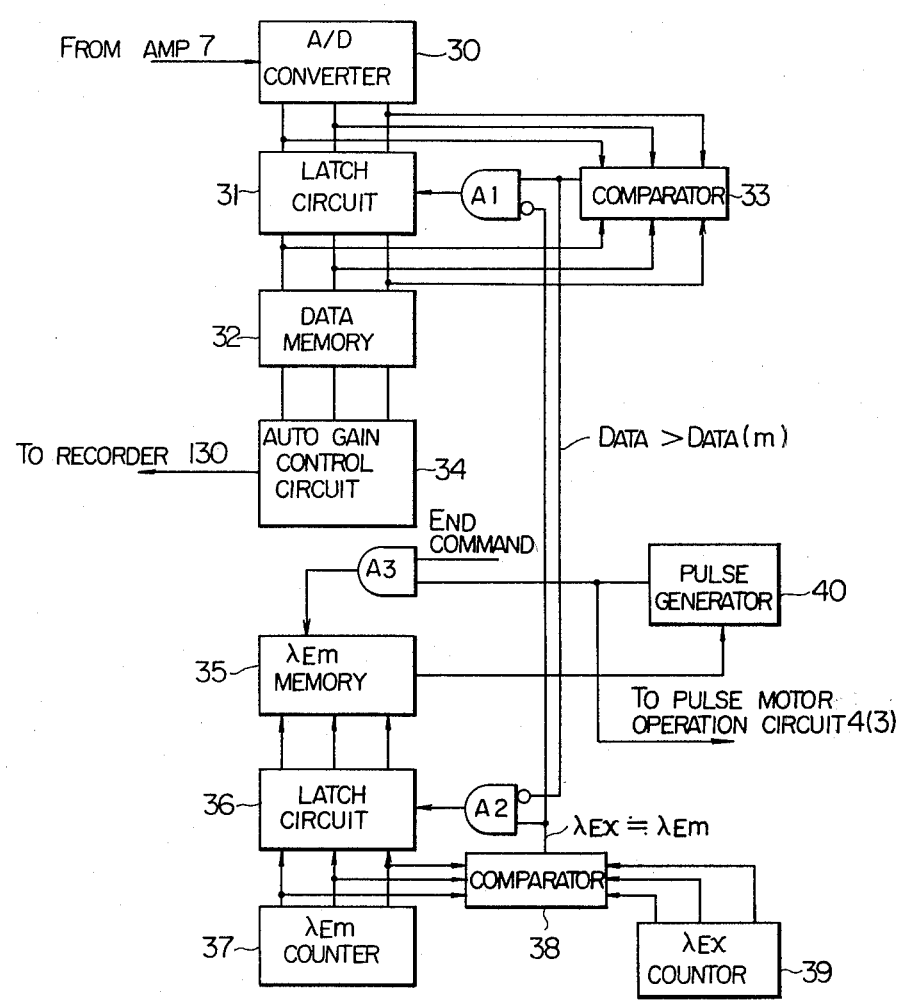
FIG. 3 is a block diagram of another embodiment of this invention.

FIG. 3 shows one such hardware constitution, that is, a circuit constitution which performs in the excitation spectrum measurement the detection of peak wavelength and the adjustment of the peak wavelength location.

In FIG. 3, an A-D converter 30 is supplied with the output from the detector 6 in FIG. 1 through the amplifier 7. The A-D converter 30, a latch circuit 31, a data memory 32, a comparator 33 and an AND circuit A1 are constituted to detect the peak value. An auto gain control circuit 34 controls the gain of an amplifier (not shown) for driving the Y-axis of the recorder 130 so that, as described above, the peak value has about 70% of the full scale of the recorder.

A memory 35 stores the maximum value (corresponding to the peak value) of fluorescence wavelength $\lambda_{Em}$. A comparator 38 compares the content of a counter 37 which provides the fluorescence wavelength $\lambda_{Em}$ with that of a counter 39 which provides the excitation wavelength $\lambda_{Ex}$ and, when both the contents are substantially equal $\lambda_{Ex} \doteq \lambda_{Em}$, makes the AND circuits A1 and A2 fail.

A latch circuit 36 makes, in response to the output from the AND circuit A2, the fluorescence wavelength $\lambda_{Em}$ of the counter 37 be stored in the memory 35.

A pulse generator 40 supplies a pulse to the pulse motor operation circuit 4 (3) for making operative the pulse motor and, at the same time, serves as a standard for comparison in the comparators 33 and 38 and latching in the latch circuits 31 and 36.

The comparator 33 compares the data Data from the A-D converter 30 and the data Data(m) from the memory 32 and, when the relation Data>Data(m) is valid, supplies its output to the AND circuits A1 and A2. The AND circuit A1 controls the latch circuit 31 when the relations Data>Data(m) and $\lambda_{Ex} \neq \lambda_{Em}$ are valid. Then, the latch circuit 31 makes the data Data from the A-D converter 30 be stored in the memory 32. Thus, the memory 32 has, as described in conjunction with FIG. 1, the maximum value stored as a result of wavelength scanning and further, when the wavelength scanning has finished, the peak value of the fluorescence spectrum stored.

On the other hand, the latch circuit makes, when the relations Data>Data(m) and $\lambda_{Ex} \neq \lambda_{Em}$ are valid, the fluorescence wavelength $\lambda_{Em}$ of the counter 37 be stored in the memory 35. Thus, when the wavelength scanning has finished, the memory 35 has the wavelength corresponding to the peak value of the fluorescence spectrum stored.

As described above, first in the excitation spectrum measurement, the peak value of the fluorescence spectrum and its peak wavelength are detected.

An AND circuit A3, when supplied with an end command, controls the pulse generator 40 in dependence on the content of the memory 35 thereby to supply a pulse to the pulse motor operation circuit 4 so that the wavelength location of the fluorescence side monochromator is set to the peak wavelength location.

Thus, the peak wavelength location has been adjusted.

As described above, in accordance with this invention, when the excitation spectrum or the fluorescence spectrum is to be measured, the fluorescence side or excitation side monochromator can be readily adjusted to be at an optimum wavelength.

Further, in accordance with this invention, when the spectrum peak is to be detected in the spectrum measurement, a peak caused by scattered light can never be misinterpreted as the spectrum peak.

What is claimed is:

1. A fluorescence spectrophotometer comprising
a light source,
an excitation side monochromator which subjects lights from said light source to spectroscopic analysis for illuminating as actinic light a sample,
a fluorescence side monochromator which subjects fluorescence light from said sample to spectroscopic analysis,
a detector which detects light from said fluorescence side monochromator,
an A-D converter which converts the output from said detector into a digital form,
memory means for storing values of the wavelengths, peak value and peak wavelength of the spectrum of said sample, and
data processing means responsive to the output of said A-D converter for applying said values to said memory means, including means for comparing the peak value stores in said memory means with the value of the output from said A-D converter as one of said two monochromators is wavelength-scanned and the other is fixed in wavelength and for storing in said memory means as said peak value the larger one of said values, means responsive to detection of the wavelengths of said two monochromators being substantially equal for rejecting the output of said A-D converter as a peak value to be stored in said memory means, means for detecting the peak value for setting the wavelength of said one of said two monochromators to the wavelength corresponding to the peak value, and recorder means which, after said data processing portion has fixed said one of said two monochromators to said peak wavelength, wavelength-scans said other of said two monochromators and records in the thus-obtained spectrum of said sample.

2. A fluorescence spectrophotometer as defined in claim 1, wherein said recorder includes means for recording a spectrum which is adjusted in such a manner that the peak value stored in said first memory means is displayed within a predetermined scale on said recorder.

3. A fluorescence spectrophotometer as defined in claim 1, wherein said data processing means includes display means for displaying the wavelengths of said two monochromators.

4. A fluorescence spectrophotometer as defined in claim 3, wherein said processing means further includes means for correcting the data to be recorded in said recorder in such a manner that the maximum peak value of the spectrum to be recorded is displayed within a predetermined scale on said recorder when said recorder records said spectrum.

* * * * *